(No Model.)

M. CÔTE.
DUST PAN.

No. 521,949.  Patented June 26, 1894.

UNITED STATES PATENT OFFICE.

MAJARIQUE CÔTE, OF MILLIS, MASSACHUSETTS.

DUST-PAN.

SPECIFICATION forming part of Letters Patent No. 521,949, dated June 26, 1894.

Application filed January 5, 1894. Serial No. 495,736. (No model.)

*To all whom it may concern:*

Be it known that I, MAJARIQUE CÔTE, of Millis, in the county of Norfolk, State of Massachusetts, have invented certain new and useful Improvements in Dust-Pans, of which the following is a description sufficiently full, clear, and exact to enable any person skilled in the art or science to which said invention appertains to make and use the same, reference being had to the accompanying drawings, forming part of this specification, in which—

Figure 1:
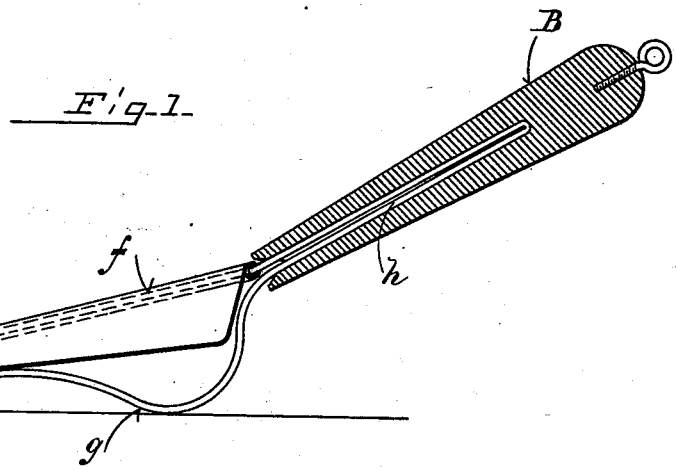
Figure 2:
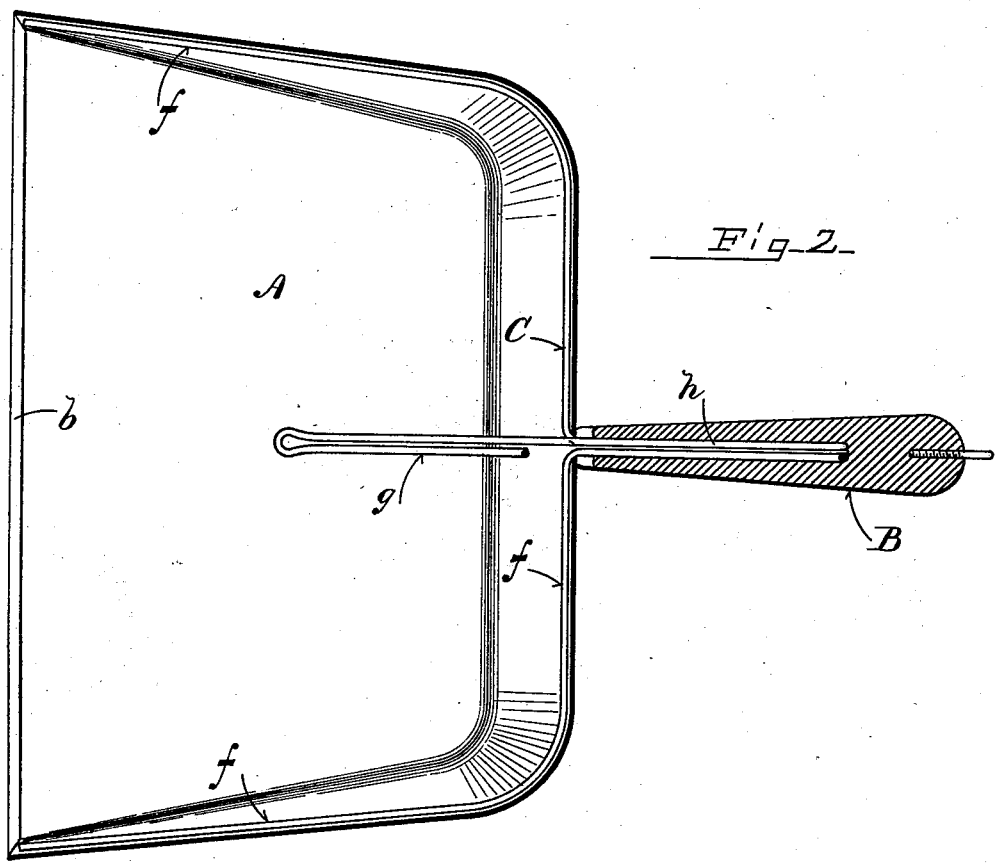

Figure 1 is a central vertical section of my improved dust pan; and Fig. 2 a bottom plan view of the same, a part of the stiffening wire being represented as broken away.

Like letters of reference indicate corresponding parts in both the figures of the drawings.

My invention relates especially to a method of constructing dust-pans and attaching the handle thereto, the object being to cheapen the cost of such construction, avoid the necessity of riveting the handle onto that class of dust-pans known as "black-iron" pans, and to increase the stiffness and durability of the ordinary dust-pan.

The nature of the improvement will be readily understood by all conversant with such matters from the following explanation:

In the drawings, A represents the body of the pan which is of the ordinary rectangular shape in plan view and may be composed of tin, sheet iron or other suitable material. The edge of the pan is bent or folded upon itself and flattened at, $b$, forming a firm non-flexible edge which will coincide readily with flat surfaces. The handle, B, is of wood. A wire, C, is bent upon itself forming two angle arms, $f$, and a loop or step, $g$, at its folded end. The handle, B, is driven upon the wire and the angle arms, $f$, are arranged under the sides and rear edge of the pan, said edges being turned over said arms by the blow of the die when the pan is formed. The loop, $g$, which is free engages the under side of the pan centrally at its rear edge and forming a step to tilt said pan forward when it is disposed on the floor serving all the purposes of the iron boss usually formed on pans of this class. The angle-arms, $f$, thus incorporated into the edges of the pan impart the required rigidity particularly when said pan is formed of tin, avoiding the necessity of reaming the edges and affording a cheap and durable method of attaching the handle. The fold, $h$, of the wire inserted in the handle offering a spring-tension securely locks said handle and prevents its rotating.

Having thus explained my invention, what I claim is—

1. In a dust-pan a body, a wire incorporated in an edge thereof and bent to form a projection under the rear edge of said body; and a handle secured to said wire.

2. In a dust pan, the body, A, in combination with the wire, C, bent to form the angle-arms, $f$, loop, $g$, fold, $h$, said wire being secured by a fold in the edges of said body and the handle, B, driven onto the fold, $h$, of said wire, all being arranged substantially as described.

MAJARIQUE CÔTE.

Witnesses:
LEMUEL CHISHOLM,
HORACE E. BALKAM.